United States Patent [19]

Leonard et al.

[11] 4,451,836

[45] May 29, 1984

[54] OPTICAL DISC WRITE/READ APPARATUS

[75] Inventors: Eric M. Leonard; Frederick F. Geyer, both of Rochester; George M. Myers, Webster, all of N.Y.

[73] Assignee: Eastman Kodak Company, Rochester, N.Y.

[21] Appl. No.: 434,204

[22] Filed: Oct. 14, 1982

[51] Int. Cl.³ ............................................. G01D 15/32
[52] U.S. Cl. .................................... 346/137; 269/284; 269/287
[58] Field of Search .............. 346/137, 76 L; 269/284, 269/287, 111, 275; 360/99

[56] References Cited

U.S. PATENT DOCUMENTS

| | | | |
|---|---|---|---|
| 3,381,085 | 4/1968 | Johnson | 346/137 X |
| 4,224,648 | 9/1980 | Roling | 360/97 |
| 4,365,257 | 12/1982 | Gerfast | 346/137 X |
| 4,365,258 | 12/1982 | Geyer | 346/137 |

*Primary Examiner*—Joseph W. Hartary

*Attorney, Agent, or Firm*—Milton S. Sales

[57] ABSTRACT

An optical disc assembly includes a flexible disc-shaped support. An annular retaining ring engages the support around its periphery. The support carries a record layer with an information storage region of the record layer located between the retaining ring and a central hub. In use on cooperating optical disc write/read apparatus having disc assembly receiving structure, the cental hub positions an annular area of the support, which area is radially inward of the storage region, against a locating surface of the receiving structure with a predetermined abutting force, whereby firm contact is assured between the support and the location surface radially inwardly of the storage region of the record layer. The disc assembly includes a flexible, transparent cover sheet which is coextensive with the support. Annular spacing means are provided between the support and the cover sheet both radially inwardly and outwardly of the information storage region to provide an axial space between the record layer and the cover sheet.

4 Claims, 7 Drawing Figures

OPTICAL DISC WRITE/READ APPARATUS

CROSS-REFERENCE TO RELATED APPLICATION

Reference is made herein to commonly-assigned, copending U.S. patent application Ser. No. 264,313, filed May 18, 1981 in the names of F. F. Geyer and E. M. Leonard now U.S. Pat. No. 4,365,258.

BACKGROUND OF THE INVENTION

1. Field of the Invention

The present invention relates to record medium and apparatus useful in high density storage of information by optical writing and/or reading, and more particularly to improved configurations for optical disc assemblies and cooperating optical disc write/read apparatus.

2. Description of the Prior Art

The currently preferred optical disc technology employs disc elements with spiral or concentric tracks of minute (e.g., on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disc.

In order to write and read information in the form of such minute markings, optical systems of high numerical aperture are used to focus light to equivalently minute spots. Such optical systems have extremely small depths of focus and the proper positional relation between the writing or reading optical system, and the optical disc record surface must be stringently maintained both smooth and flat.

One approach to achieve requisite smoothness and flatness has been to form the disc substrate of glass with a ground and polished surface. This requires a time consuming and costly fabrication procedure. Another approach is to mold a plastic disc substrate with a highly finished surface and apply a surface smoothing sub-layer. However, it is extremely difficult to mold such plastic discs having adequate surface characteristics with a good yield; and this support fabrication method is also relatively costly.

Another approach for meeting smoothness, flatness and protective requirements is disclosed in commonly-assigned, copending U.S. patent application Ser. No. 264,313 filed May 18, 1981 in the names of F. F. Geyer and E. M. Leonard now U.S. Pat. No. 4,365,258. In that approach an improved optical disc assembly adapted for high density storage of information comprises (i) a flexible, disc-shaped support carrying a record layer; (ii) a transparent disc cover sheet opposing the record layer, and (iii) an annular retaining ring for holding the support and cover sheet in circumferentially-symmetric tension. The support material may be held in a relatively low tension by the retaining ring and tensioned to an operating tension when drawn over an annular locating surface on the disc assembly receiving structure of the optical disc write/read apparatus. Thus the disc assembly can normally be kept with the support material in relatively low "storage" tension, and used with the support material in a higher "operating" tension to enhance flatness.

SUMMARY OF THE INVENTION

The present invention is an improvement over the optical disc write/read apparatus of the aforementioned copending U.S. patent application. It is intended to assure accurate positioning of the record layer relative to the focal plane of the optical system of the apparatus, and to enhance the higher tension of the support material in its "operating" mode.

An optical disc assembly for use with the optical disc apparatus of the invention includes a flexible disc-shaped support. An annular retaining ring engages the support around its periphery. The support carries a record layer with an information storage region of the record layer located between the retaining ring and a central hub. Cooperating optical disc write/read apparatus in accordance with the present invention has disc assembly receiving structure which positions an annular area of the support, which area is radially inward of the storage region, against a locating surface of the receiving structure with a predetermined abutting force, whereby firm contact is assured between the support and the locating surface radially inwardly of the storage region of the record layer.

The disc assembly preferably includes a flexible, transparent cover sheet which is coextensive with the support. Annular spacing means are provided between the support and the cover sheet both radially inwardly and outwardly of the information storage region to provide an axial space between the record layer and the cover sheet.

Also preferably, the hub is a rigid member, and the locating surface of the disc assembly receiving structure engages the support radially outwardly of the hub. The hub urges the support in a predetermined tensioning relation with the locating surface whereby the higher tension of the support material in the "operating" mode is enhanced. Such urging of the support is accomplished in the illustrated embodiment by magnetic attraction of the hub to a position whereat the support material is tensioned partially around the locating surface. The magnetic attraction may operate against the force of a spring biased spindle as well as against the tension in the support.

The invention and its objects and advantages, will become more apparent in the detailed description of the preferred embodiments presented below.

BRIEF DESCRIPTION OF THE DRAWINGS

The description of preferred embodiments refers to the attached drawings wherein.

DESCRIPTION OF THE PREFERRED EMBODIMENTS

Figure 1:
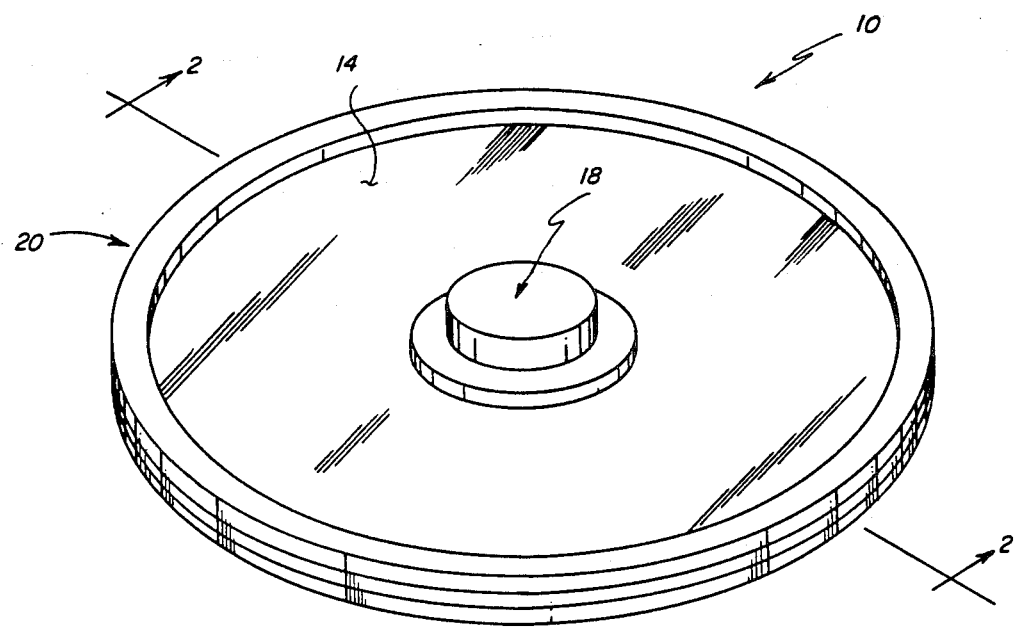
FIG. 1 is a perspective schematic view of an optical disc assembly particularly suited for use with an optical disc write/read apparatus according to the present invention.
Figure 2:
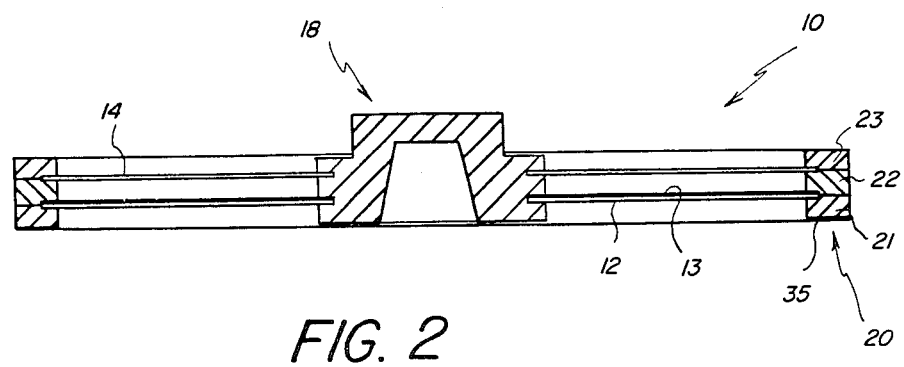
FIG. 2 is a sectional view of the disc assembly shown in FIG. 1.

Referring to schematic FIGS. 1 and 2, an optical disc assembly 10 includes a flexible, disc-shaped support 12 having record layer 13 (and other appropriate layers) on one major surface of the support. The disc assembly also includes a disc cover in the form of a continuous, flexible, disc-shaped sheet 14 which is substantially transparent with respect to the write and/or read wavelength suitable for use with the record layer. The diameter of cover sheet 14 corresponds generally to the diameter of support 12.

Support 12 and cover sheet 14 are held in spaced relation by a central hub 18 and an annular retaining ring 20, the latter of which engages support 12 and cover sheet 14 substantially continuously around respective annular peripheral regions. Record layer 13 has a predetermined annular information storage region radially intermediate hub 18 and retaining ring 20.

It is highly preferred that cover sheet 14 and disc-shaped support 12 be retained in circumferentially-symmetric tension, and this is accomlished in the illustrated embodiment by cooperating annular ring members 21, 22 and 23 of retaining ring 20. It is also highly preferred that the cooperative engagement between disc-shaped support 12, cover sheet 14, central hub 18, and retaining ring 20 significantly seal the space between record layer 13 on support 12 and the opposed surface of cover sheet 14.

The reader is referred to the aforementioned copending U.S. patent application for a description of useful and preferred materials and characteristics for the disc-shaped support and the cover sheet. The disclosure of that application is specifically incorporated herein by reference. Several examples of suitable retaining rings also are disclosed in said copending application. It is sufficient to note here that the retaining ring has means for engaging and urging support 12 and cover sheet 14 into spaced relation in circumferentially symmetrical tension. This, with the central hub, maintains the proper spaced relation between the members, maintains a flat orientation of the members and provides an air seal of the space between the members.

In general, preferred tensions for the disc-shaped support material and cover sheet material are from substantially zero to just below the elastic limit, or yield point, of those materials. More specifically, the preferred tension depends upon the desired degree of planarity for the particular member (i.e. size, composition, etc.) used. It is preferred that "storage" and "operating" support material tensions be below the elastic limit of the particular material; however, in certain applications some yield can be acceptable as long as surface planarity remains in the desired tolerance. In general, the tension (particularly storage tension) should be selected with respect to the support material so that the stressed material's continuous relaxation over time (i.e. material creep) is slow enough to insure adequate spacing and planarizing tension throughout the expected product life period.

Figure 3:
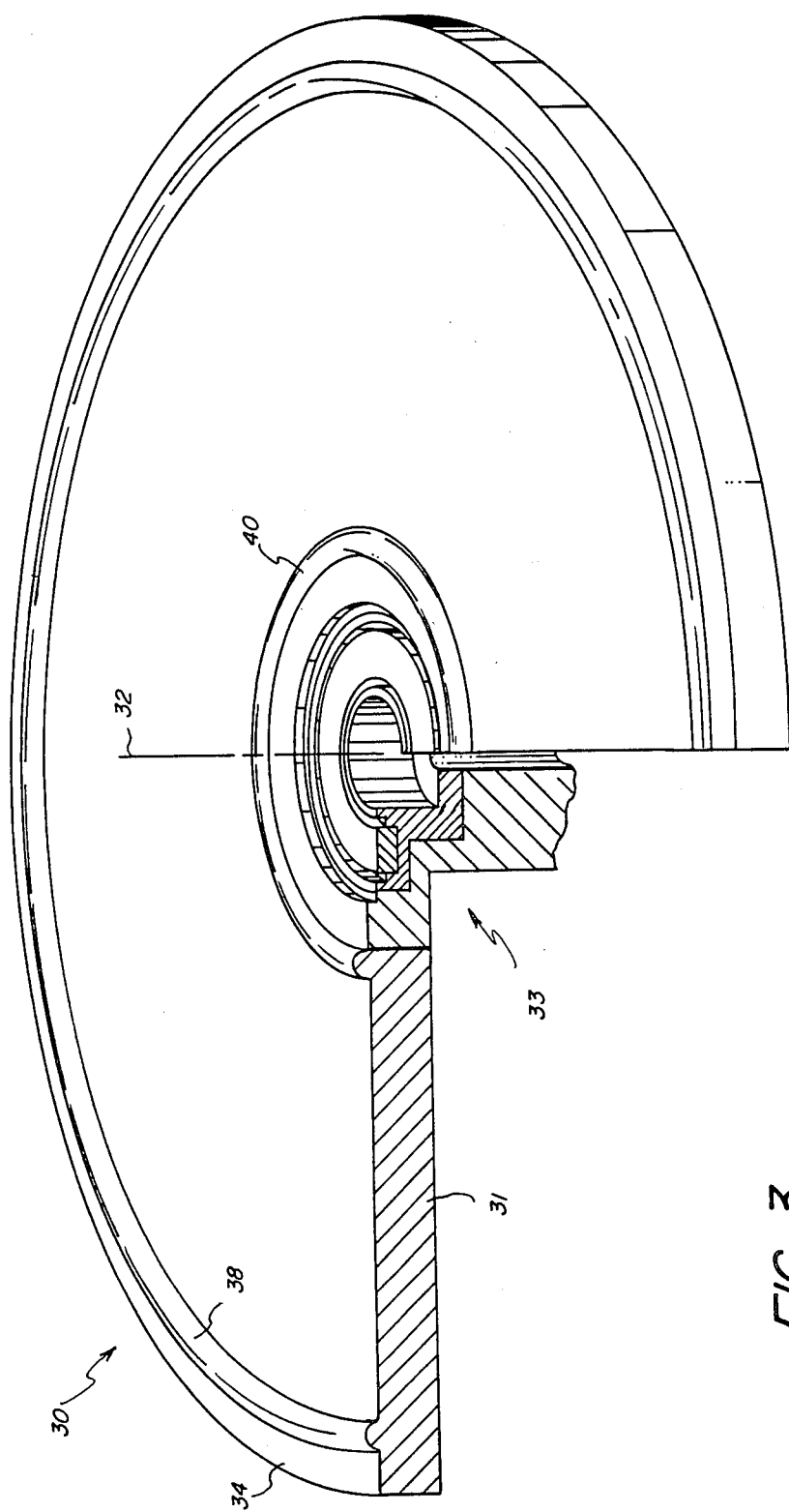
FIG. 3 is a fragmented perspective view of a specific disc assembly embodiment.

FIG. 3 shows one preferred embodiment of disc assembly receiving structure 30 on cooperating optical disc write/read apparatus useful in combination with the above-described optical disc assembly. The optical disc write/read apparatus is similar to the various other optical disc write/read apparatus known in the art, and only the disc assembly receiving structure 30 which cooperates more directly with the present disc assembly will be described in detail.

Disc assembly receiving structure 30 comprises a turntable 31 adapted for rotation about axis 32 on a spindle assembly 33 by drive means (not shown). Turntable 31 includes a clamping surface 34 in a plane generally normal to axis 32 and engageable by a bearing surface 35 on ring member 21 of the disc assembly (FIG. 2). The turntable also includes mechanical or magnetic means (not shown) for locating annular retaining ring 20 of disc assembly 10. The optical disc write/read apparatus also includes an optics system, represented by lens 36, which is adapted to focus write/read light in a focal plane that is normal to axis 32.

A pair of annular locating surfaces 38 and 40 on turntable 31 rotate in a plane substantially normal to axis 32. Locating surfaces 38 and 40 are positioned to engage support 12 in annular areas which are respectively radially outward and inward of the annular information storage region of record layer 13. The locating surfaces have predetermined dimensions with respect to the focal plane of the optics system of the disc write/read apparatus and the thickness of support 12 so that recording layer 13 of a disc assembly located on the turntable will closely proximate a nominal focal plane position of lens 36. Thus the internal tolerances of retaining ring 20 are significantly decreased. Similarly the locational tolerance of clamping surface 34 is increased.

The relation of clamping surface 34, locating surfaces 38 and 40, and (as will be explained herein) spindle assembly 33 is such that the material of support 12 is further tensioned (in circumferentially-symmetric manner) when mounted on the turntable because the support is at that time positioned in a predetermined tensioning relation with annular locating surfaces 38 and 40. This affords the ability to construct disc assembly 10 so that the support material is in a relatively low, "storage" tension and in a relatively high, "operating" tension during use. This feature can decrease long term failure of the support, which might occur in some materials, when stored in high tension. In addition, this has the advantage of compensating for tension changes due to variation in the operating environment.

Figure 4:
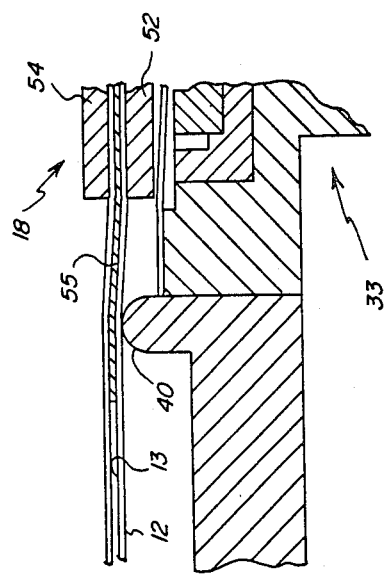
FIGS. 4 and 5 are fragmented sectional views of the optical disc assembly of FIG. 3 and cooperating optical disc write/read apparatus.
Figure 4:
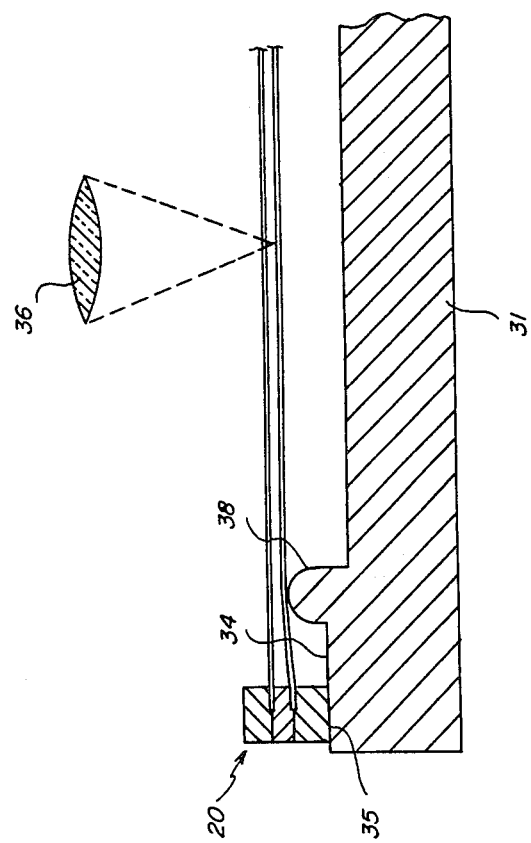
Figure 5:
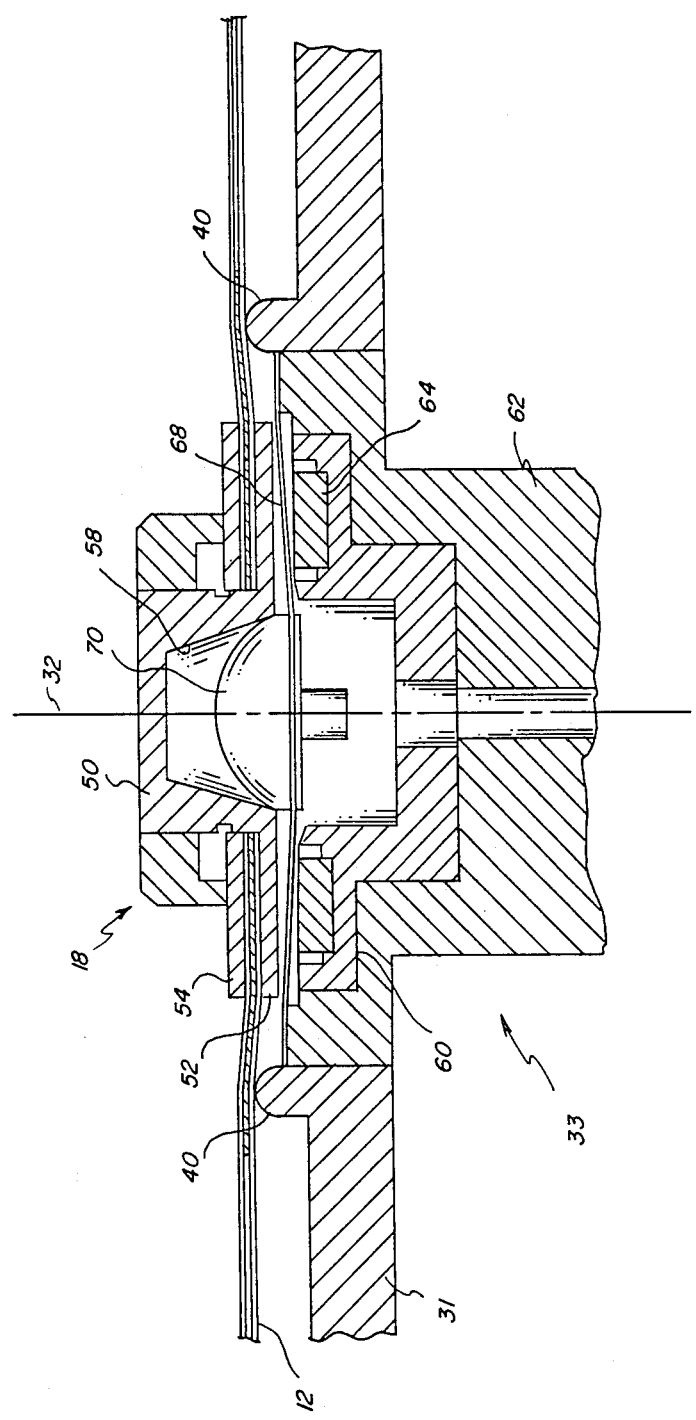

Details of central hub 18 and spindle assembly 33, and their cooperation, can be better seen in FIG. 5. The hub is cylindrical, and has four parts. A base 50 is preferably constructed of magnetically attracted material and has a radially extending flange 52. Support 12, cover sheet 14, and a specer 55 (FIG. 4) are clamped to the flange by a suitable means such as a hold down washer 54 and a threaded lock ring, as illustrated. A mechanical press fit or adhesive connection would also be suitable. A conical relief 58 is formed in the base as shown in the drawing.

Spindle assembly 33 is an integral part of turntable 31, and includes a two-piece base 60 and 62. Base piece 62 has a cylindrical T-shape with the top formed to accept base piece 60. The inner base is of non-ferrous material and has a recess for a bonded wafer magnet 64.

Figure 6:
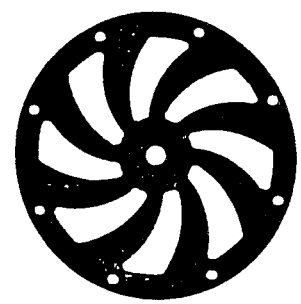
FIG. 6 is a top plan view of a portion of the cooperating optical disc write/read apparatus of FIG. 5.

A flat, wheel-like spring 68 is attached to the top of base piece 62 by any suitable means such as adhesives, screws, or pins. The spring, which is shown in top plan view in FIG. 6, has a plurality of spokes which follow the Archimedian spiral. This configuration assures that the center of the spring will travel along axis 32 without radial movement as the spring flexes. That is, a hub support element, such as hemispherical spindle 70 which is attached to the center of spring 68 will have resiliently resisted axial freedom of movement, but not radial freedom.

Hemispherical spindle 70 is machined to mate with conical relief 58 in base 50 to produce line contact. This reduces the adverse effects of wear and dirt accumulation.

In operation, central hub 18 is placed over spindle assembly 33, and annular retaining ring 20 is clamped or otherwise held onto surface 34. Magnet 64 attracts hub base 50 and draws it downwardly as shown in FIG. 5. Spring 68 flexes, and the hub continues until the magnetic (and gravitational) forces are balanced by the spring force and the tension in the material support 12.

By providing for hub 18 to "float" above spindle assembly 33, dimensional and locational tolerances of the spindle can be increased somewhat. Further, good contact between support 12 and annular locating surface 40 is assured, and support tension is enhanced. The existence of an air gap between magnet 64 and base 52 makes disc assembly removal easier because of weaker attractive forces.

Figure 7:
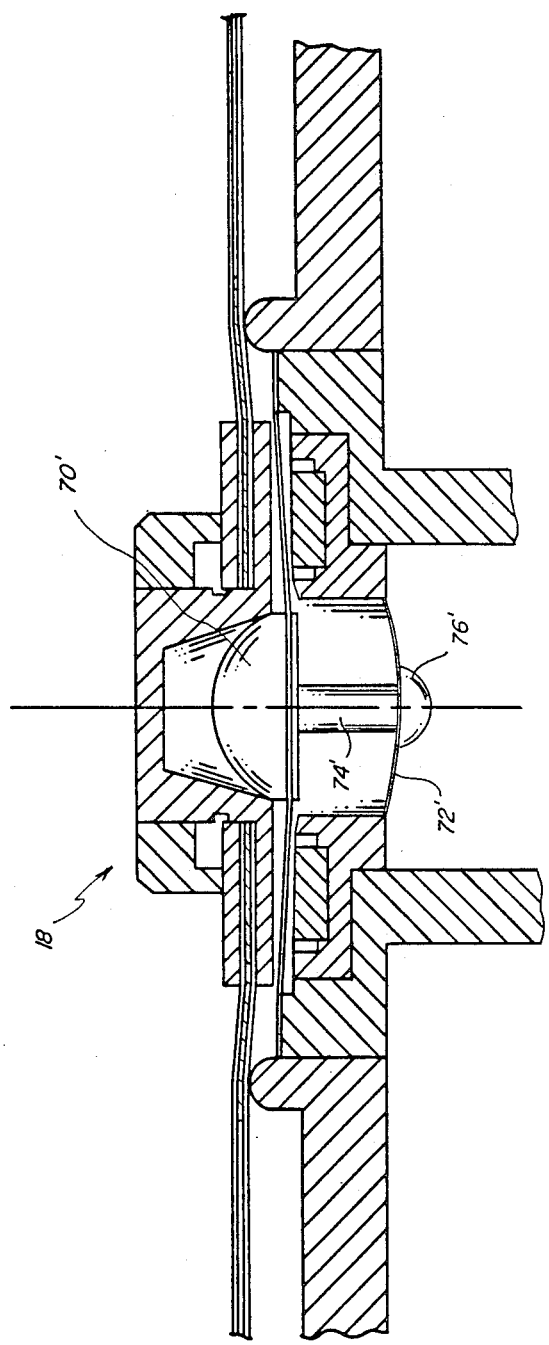
FIG. 7 is a fragmented sectional view illustrating an alternative embodiment of cooperating optical disc write/read apparatus.

A second embodiment of the spindle assembly is shown in FIG. 7. The principle difference between embodiments is the inclusion of a second spring 72' attached to rod 74' of hemispherical spindle 70' by a head 76'. The second spindle further constrains spindle 70' to axial movement.

The invention has been described in detail with particular reference to certain preferred embodiments thereof, but it will be understood that variations and modifications can be effected within the spirit and scope of the invention.

We claim:

1. Optical disc write and/or read apparatus adapted for use with an optical disc assembly including (1) a flexible, disc-shaped support carrying a record layer with an annular storage region, (2) an annular retaining ring engaging said support around its peripheral region, and (3) a central hub; said apparatus comprising:

(a) lens means for focusing light at a focal plane normal to a predetermined axis;
   (b) disc assembly receiving structure having (1) an annular locating surface rotatable about said axis in a plane normal to said axis, and (2) means for mounting the central hub of a disc assembly such that an annular area of the disc assembly support radially inward of said storage region is in a predetermined abutting force against the locating surface of said receiving structure to provide firm contact between the disc assembly support and said locating surface.

2. Optical disc write and/or read apparatus adapted for use with an optical disc assembly including (1) a flexible, disc-shaped support carrying a record layer with an annular storage region, (2) an annular retaining ring engaging said support around its peripheral regions for holding the support in a first predetermined circumferentially-symmetric tension suitable for storage of the assembly, and (3) a central hub, said apparatus comprising:

(a) lens means for focusing light at a focal plane normal to a predetermined axis;
   (b) disc assembly receiving structure having (1) an annular locating surface rotatable about said axis in a plane normal to said axis, and (2) means for mounting the central hub of a disc assembly such that an annular area of the disc assembly support engages said locating surface radially inward of said storage region for effecting a second and greater predetermined circumferentially-symmetric tension in the support during use.

3. The apparatus set forth in claim 2 wherein said hub mounting means includes a flat wheel-like spring having a plurality of spokes which follow an Archimedian spiral.

4. The apparatus set forth in claim 2 wherein said hub mounting means includes:

(a) a flat wheel-like spring having a plurality of spokes which follow an Archimedian spiral; and
   (b) a spherical spindle attached to the radial center of said wheel-like spring.

* * * * *